United States Patent
Mritunjai et al.

(10) Patent No.: US 12,182,163 B1
(45) Date of Patent: Dec. 31, 2024

(54) DIFFERENT TYPES OF INDEX STRUCTURES FOR STORING DATABASE DATA IN A REPLICA GROUP

(71) Applicant: Amazon Technologies, Inc., Seattle, WA (US)

(72) Inventors: Akhilesh Mritunjai, Seattle, WA (US); James Christopher Sorenson, Seattle, WA (US); Akshat Vig, Seattle, WA (US); Richard Krog, Bainbridge Island, WA (US); Adel Gawdat, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 47 days.

(21) Appl. No.: 16/915,830

(22) Filed: Jun. 29, 2020

(51) Int. Cl.
*G06F 16/27* (2019.01)
*G06F 16/22* (2019.01)

(52) U.S. Cl.
CPC ........ *G06F 16/273* (2019.01); *G06F 16/2228* (2019.01)

(58) Field of Classification Search
CPC ..... G06F 16/273; G06F 16/2228; G06F 16/27
See application file for complete search history.

(56) References Cited

U.S. PATENT DOCUMENTS

| | | | |
|---|---|---|---|
| 9,213,716 B2 | 12/2015 | Schreter et al. | |
| 9,218,142 B2 | 12/2015 | Hamedani et al. | |
| 9,262,458 B2 | 2/2016 | Schreter | |
| 2011/0252007 A1* | 10/2011 | Cho | G06F 3/064 707/693 |
| 2013/0110766 A1* | 5/2013 | Promhouse | G06F 16/2365 707/607 |
| 2014/0006411 A1* | 1/2014 | Boldyrev | G06F 16/2264 707/741 |
| 2014/0006720 A1* | 1/2014 | Hosokawa | G06F 11/073 711/141 |
| 2014/0351523 A1* | 11/2014 | Samanta | G06F 12/0871 711/130 |
| 2017/0091226 A1* | 3/2017 | Kharatishvili | G06F 16/2228 |
| 2017/0364273 A1* | 12/2017 | Schreter | G06F 3/0619 |
| 2019/0392006 A1* | 12/2019 | Horowitz | G06F 16/178 |
| 2020/0183584 A1* | 6/2020 | Somasundaram | G06F 3/0605 |
| 2020/0285634 A1* | 9/2020 | Jho | G06F 16/2246 |
| 2020/0380046 A1* | 12/2020 | Guo | G06F 16/90344 |
| 2021/0019298 A1* | 1/2021 | Hegde | G06F 16/2379 |

* cited by examiner

*Primary Examiner* — Allen S Lin
(74) *Attorney, Agent, or Firm* — S. Scott Foster; Kowert, Hood, Munyon, Rankin & Goetzel, P.C.

(57) ABSTRACT

Different types of index structures are used for a replica group of a database. A leader node of a replica group performs receives updates to a copy of the database using a first type of index structure. A follower node performs updates received from the leader node as a log of updates to a copy of the database in an external storage system when a size of the received updates exceeds a threshold. The follower node performs requests to read data from the database using the copy in the external storage.

20 Claims, 10 Drawing Sheets

DIFFERENT TYPES OF INDEX STRUCTURES FOR STORING DATABASE DATA IN A REPLICA GROUP

BACKGROUND

Database systems managing large amounts of data on behalf of users may distribute and/or replicate that data across two or more machines, often in different locations, for any of a number of reasons, including security issues, disaster prevention and recovery issues, data locality and availability issues, etc. As the scale of data stored increases, database systems may implement different techniques for distributing and replicating data that can cope with the increasing demand upon data storage resources to provide highly performant access to data while still preserving the various management features that contribute to data availability and durability.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement different types of index structures for storing database data in a replica group, according to some embodiments. Replica groups may be implemented for databases in various embodiments to provide resilience, durability, and additional request processing capacity (e.g., additional read requests) for a database in a database system. The benefits provided by replica groups are not without costs. For instance, high-performance database systems may rely upon special storage hardware (e.g., SSDs, non-volatile memory, etc.) to provide quick access to database data. While some copies of database data may be used for responding to requests, some copies that are used to increase durability and resiliency to failure may be hosted in the same costly storage technology. Thus, techniques that reduce the costs of providing durability and resiliency without decreasing performance if or when the copy is utilized for accessing the database are thus highly desirable.

Using different types of index structures across a replica group may allow for different types of storage technologies to be utilized to store the database data without sacrificing performance. For example, one type of index structure that can take advantage of the performance capabilities of one type of storage may be used in order to provide similar read performance for one member of a replica group, whereas another replica group member can utilize another type of index structure for another type of storage and offer similar results. In this way, the performance of a replica group can be tailored to different storage technologies.

Figure 1:
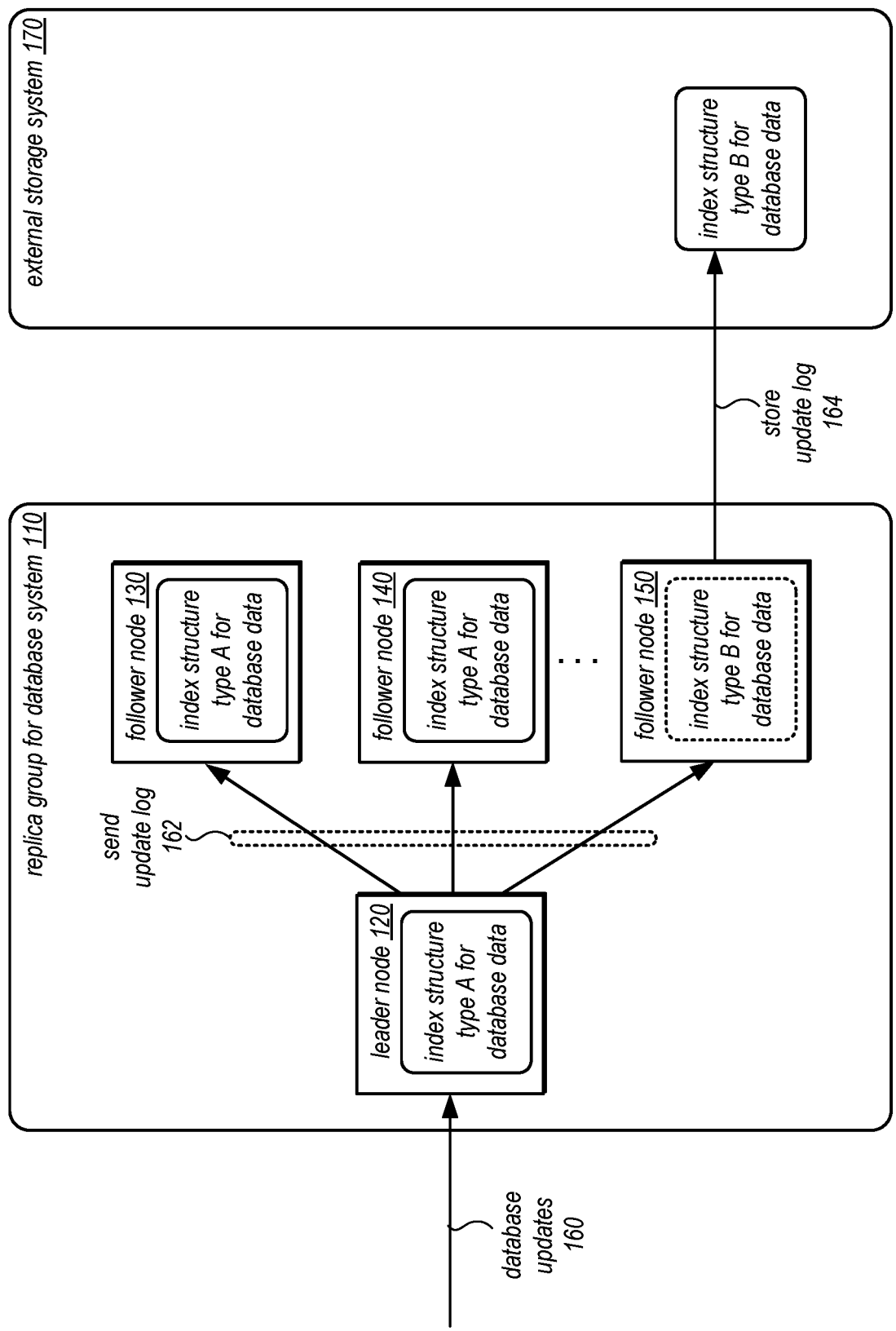
FIG. 1 is a logical block diagram illustrating different types of index structures for storing database data in a replica group, according to some embodiments.

FIG. 1 is a logical block diagram illustrating different types of index structures for storing database data in a replica group, according to some embodiments. A database system may store collections of data objects (e.g., records, rows, entries, or other items in tables, buckets, or other containers), in some embodiments. In some embodiments, databases may be non-relational, semi-structured or otherwise organized to not enforce an exact same schema (e.g., same number of attributes) on each item stored as part of the table, in some embodiments. In other embodiments, relational databases or other types of database may structure, relate, or enforce a schema on items in a table.

Replica group for database system 110 may utilize multiple different nodes, such as leader node 120 and follower nodes 130, 140, and 150. Each node may utilize an index structure to store data (e.g., local in the database system or remotely in external storage system 170). For example, leader node 120 and follower nodes 130 and 140 may use index structure type A (e.g., a b– tree) and follower node 150 may utilize index structure type B (e.g., a log-structured merge tree).

As illustrated in FIG. 1, leader node 120 may receive database updates 160. The leader node may perform the updates, and send an update log 162 to replicate the updates to follower nodes 130, 140, and 150. As follower nodes 130 and 140 use local storage, the updates may be locally applied. As follower node 150 uses external storage system 170, follower node 150 may store the update log 164 according to the different type of index structure, type B, in external storage system 170. In this way, a different performance characteristic or cost advantage of external storage system can be utilized for follower node 150.

Please note that previous descriptions of implementing different types of index structures for storing database data in a replica group are not intended to be limiting, but are merely provided as logical examples.

This specification begins with a general description of a provider network that may implement a database service that may different types of index structures for storing database data in a replica group. Then various examples of a database service are discussed, including different components/modules, or arrangements of components/module, that may be employed as part of implementing the database service, in some embodiments. A number of different methods and techniques to implement different types of index structures for storing database data in a replica group are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
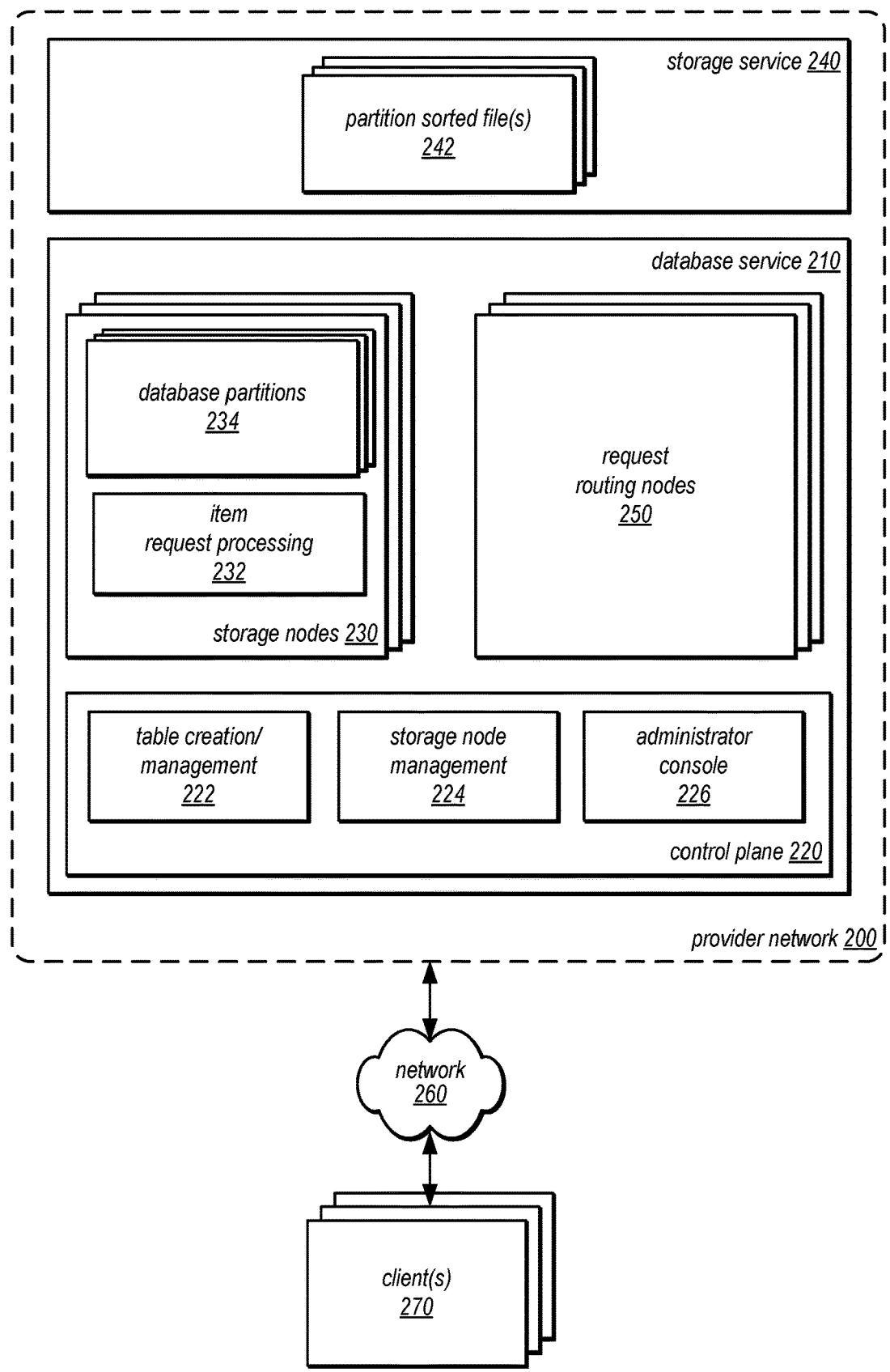
FIG. 2 is a logical block diagram illustrating a provider network offering a database service that may implement different types of index structures for storing database data in a replica group, according to some embodiments.

FIG. 2 is a logical block diagram illustrating a provider network offering a database service that may implement different types of index structures for storing database data in a replica group, according to some embodiments. Provider network 200 may be a private or closed system, in some embodiments, or may be set up by an entity such as a company or a public sector organization to provide one or more services (such as various types of cloud-based storage) accessible via the Internet and/or other networks to clients 270, in another embodiment. In some embodiments, provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In some embodiments, provider network 200 may implement various computing resources or services, such as database service 210 (e.g., a non-relational (NoSQL) database, relational database service or other database service that may utilize collections of items (e.g., tables that include items)), and other services (not illustrated), such as data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 10 and described below. In some embodiments, the functionality of a given system or service component (e.g., a component of key value database service 210) may be implemented by a particular node or may be distributed across several nodes. In some embodiments, a given node may implement the functionality of more than one service system component (e.g., more than one data store component).

Database service 210 may be implemented various types of distributed database services, in some embodiments, for storing, accessing, and updating data in tables hosted in key-value database. Such services may be enterprise-class database systems that are highly scalable and extensible. In some embodiments, access requests (e.g., requests to get/obtain items, put/insert items, delete items, update or modify items, scan multiple items) may be directed to a table in database service 210 that is distributed across multiple physical resources, and the database system may be scaled up or down on an as needed basis. In some embodiments, clients/subscribers may submit requests in a number of ways, e.g., interactively via graphical user interface (e.g., a console) or a programmatic interface to the database system. In some embodiments, database service 210 may provide a RESTful programmatic interface in order to submit access requests (e.g., to get, insert, delete, or scan data).

In some embodiments, clients 270 may encompass any type of client configurable to submit network-based requests to provider network 200 via network 260, including requests for database service 210 (e.g., to access item(s) in a table in database service 210). For example, in some embodiments a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in database service 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in some embodiments. In some embodiments, client 252700 may generate network-based services requests according to a Representational State Transfer (REST)-style network-based services architecture, a document- or message-based network-based services architecture, or another suitable network-based services architecture. Note that in some embodiments, clients of database service 210 may be implemented within provider network 200 (e.g., applications hosted on a virtual compute service).

In some embodiments, clients of database service 210 may be implemented on resources within provider network 200 (not illustrated). For example, a client application may be hosted on a virtual machine or other computing resources implemented as part of another provider network service that may send access requests to database service 210 via an internal network (not illustrated).

In some embodiments, a client 270 may provide access to provider network 200 to other applications in a manner that is transparent to those applications. For example, client 270 may integrate with a database on database service 210. In such an embodiment, applications may not need to be modified to make use of a service model that utilizes database service 210. Instead, the details of interfacing to the database service 210 may be coordinated by client 270.

Client(s) 270 may convey network-based services requests to and receive responses from provider network 200 via network 260, in some embodiments. In some embodiments, network 260 may encompass any suitable combination of networking hardware and protocols necessary to establish network-based-based communications between clients 270 and provider network 200. For example, network 260 may encompass the various telecommunications networks and service providers that collectively implement the Internet. In some embodiments, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in some embodiments, client(s) 270 may communicate with provider network 200 using a private network rather than the public Internet.

Database service 210 may implement request routing nodes 250, in some embodiments. Request routing nodes 250 may receive and parse access requests, in various embodiments in order to determine various features of the request, to parse, authenticate, throttle and/or dispatch access requests, among other things, in some embodiments. As discussed in detail below with regard to FIG. 3, request routing nodes 250 may incorporate sub-table indexing 252 to perform various aspects of directed items to the appropriate partitions according to the indexing schemes discussed below with regard to FIGS. 5A-8.

In some embodiments, database service 210 may implement control plane 220 to implement one or more administrative components, such as automated admin instances which may provide a variety of visibility and/or control functions). In various embodiments, control plane 220 may direct the performance of different types of control plane operations among the nodes, systems, or devices implementing database service 210, in some embodiments. Control plane 220 may provide visibility and control to system administrators via administrator console 226, in some embodiment. Admin console 226 may allow system administrators to interact directly with database service 210 (and/or the underlying system). In some embodiments, the admin console 226 may be the primary point of visibility and control for database service 210 (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a table, at database service 210, in some embodiments.

Storage node management 224 may provide resource allocation, in some embodiments, for storing additional data in table submitted to database key-value service 210. For instance, control plane 220 may communicate with processing nodes to initiate the performance of various control plane operations, such as moves of multi-table partitions, splits of multi-table partitions, update tables, delete tables, create indexes, etc. . . . In some embodiments, control plane 220 may include a node recovery feature or component that handles failure events for storage nodes 230, and request routing nodes 250 (e.g., adding new nodes, removing failing or underperforming nodes, deactivating or decommissioning underutilized nodes, etc).

Various durability, resiliency, control, or other operations may be directed by control plane 220. For example, storage node management 224 may detect split, copy, or move events for multi-table partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical file system mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

In some embodiments, each database partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault.

Control plane 220 may implement table creation and management 222 to manage the creation (or deletion) of database tables hosed in database service 210, in some embodiments. For example, a request to create a table may be submitted via administrator console 226 which may initiate performance of a workflow to generate appropriate system metadata (e.g., a table identifier that is unique with respect to all other tables in database service 210, table performance or configuration parameters, etc.). Because tables may be stored in multi-table partitions, resource allocation for a table to be created may be avoided as multi-partition tables may be updated to handle additional data according to storage node management 224, or other partition management features, in some embodiments.

In some embodiments, database service 210 may also implement a plurality of storage nodes 230, each of which may manage one or more partitions of a database table on behalf of clients/users or on behalf of database service 210 which may be stored in database storage 234 (on storage devices attached to storage nodes 230 or in network storage accessible to storage nodes 230).

Storage nodes 230 may implement item request processing 232, in some embodiments. Item request processing 232 may perform various operations (e.g., read/get, write/update/modify/change, insert/add, or delete/remove) to access individual items stored in tables in database service 210, in some embodiments. In some embodiments, item request processing 232 may support operations performed as part of a transaction, including techniques such as locking items in a transaction and/or ordering requests to operate on an item as part of transaction along with other requests according to timestamps (e.g., timestamp ordering) so that storage nodes 230 can accept or reject the transaction-related requests. In some embodiments, item request processing 232 may maintain database partitions 234 according to a database model (e.g., a non-relational, NoSQL, or other key-value database model). Item request processing may include processing for sub-tables, as discussed below with regard to FIG. 4.

In some embodiments, database service 210 may provide functionality for creating, accessing, and/or managing tables or secondary indexes at nodes within a multi-tenant environment. For example, database partitions 234 may store table item(s) from multiple tables, indexes 238, or other data stored on behalf of different clients, applications, users, accounts or non-related entities, in some embodiments. Thus database partitions 234 may be multi-tenant, in some embodiments when storing items from different database tables. In some embodiments, an index may include table items 236 (e.g., in a B+ tree).

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of particular portion of data (e.g., a partition) for the database service 210, as discussed below with regard to FIG. 3. Moreover, different replica groups may utilize overlapping nodes, where a storage node 230 may be a member of multiple replica groups, maintaining replicas for each of those groups whose other storage node 230 members differ from the other replica groups.

Different models, schemas or formats for storing data for database tables in database service 210 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more name-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no predefined schema other than their reliance on the primary key.

Metadata or other system data for tables may also be stored as part of database partitions using similar partitioning schemes and using similar indexes, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Storage service 240 may be file, object-based, or other type of storage service that may be used to store partition sorted files 242 for external storage replica group members as discussed below with regard to FIG. 3. Storage service 240 may implement striping, sharding, or other data distribution techniques so that different portions of a file 242 are stored across multiple locations (e.g., at separate nodes) allowing for parallel reads to perform various operations such as read request handling and new replica creation, as discussed below with regard to FIGS. 4-5B and 9.

Figure 3:
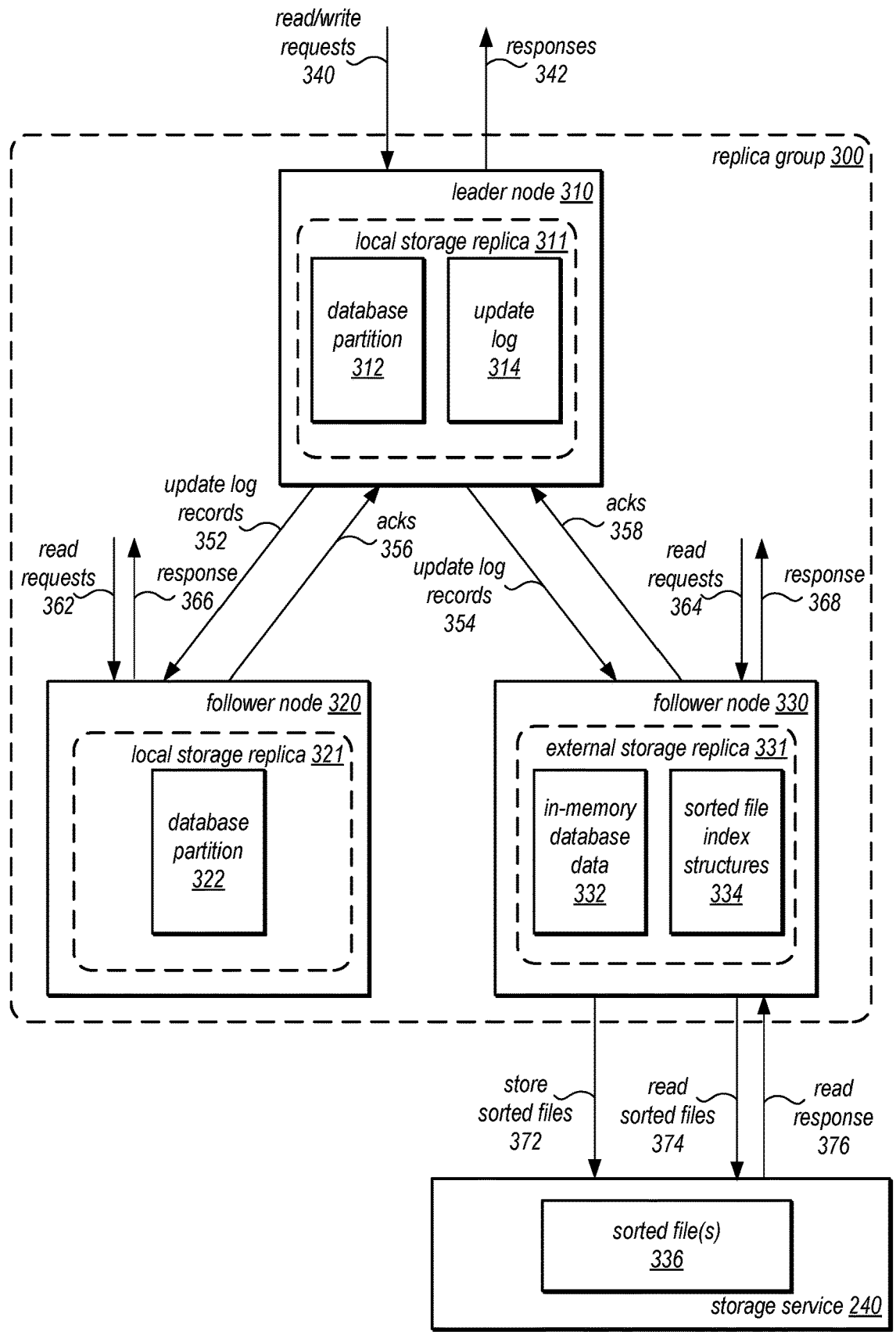
FIG. 3 is a logical block diagram illustrating a replica group for a database, according to some embodiments.

FIG. 3 is a logical block diagram illustrating a replica group for a database, according to some embodiments. Replica group 300 may include multiple storage nodes, such as storage nodes 230 in FIG. 2 above, in various embodiments. In some scenarios, replica group 300 may be only a single node (e.g., in failure modes, degraded modes, or different performance modes (not illustrated). Leader node 310 may accept both read and write requests 340 for the database and return responses 342 to those requests. In various embodiments, leader node 310 may store a database partition 312 to perform the requests and perform reads, as a local storage replica 311. As discussed above with regard to FIG. 1 and below with regard to FIG. 6, the leader node may create an update log 314 to record updates made by write requests.

Leader node 310 may send update log records to follower nodes, such as follower node 320 as indicated at 352 and follower node 330, as indicated at 354. Different types of storage replicas may be implemented at different follower nodes. For example follower node 320 may be a local storage replica 321, which may apply the updates to database partition 322. When updates are applied, follower node 356 may send an acknowledgement of the updates. Follower node 330 may implement an external storage replica 331. As discussed above with regard to FIG. 1, external storage replicas may use a different type of index than local storage replicas (e.g. log-structured merge tree instead of a b– tree index). Follower node 330 may store update log records in in-memory database data 332 and then store 372 them as sorted files 336 in storage service 240, when a size of update log records is exceeded, as discussed below with regard to FIGS. 6 and 7.

In some embodiments, follower nodes may perform read requests. For example read requests 364 may be received at follower node 330. Follower node 330 may also create sorted file index structures 334, such as bloom filters or skip lists, to determine which sorted files to read when storing sorted files 336. Thus follower node 330 may access the sorted file index structures 334 to determine which sorted files to read to return a response, as discussed below with regard to FIG. 8. As also discussed below with regard to FIG. 8, in some embodiments, in-memory database data 332 may also store hot (e.g., frequently accessed) items so that they may be cached in memory to answer read requests. In some embodiments, other type of caching strategies, such as cold caches for point queries, may be implemented in addition to or instead of hot data caches. Follower node 320 may also receive read requests and may return a response using database partition 322.

In some embodiments, leader node 310 may truncate or remove old log records from update log 314 when acknowledged (e.g., 356 and 358) by each follower node. In some embodiments, follower node 330 may not acknowledge 358 until the log records are stored as sorted files 372.

Figure 4:
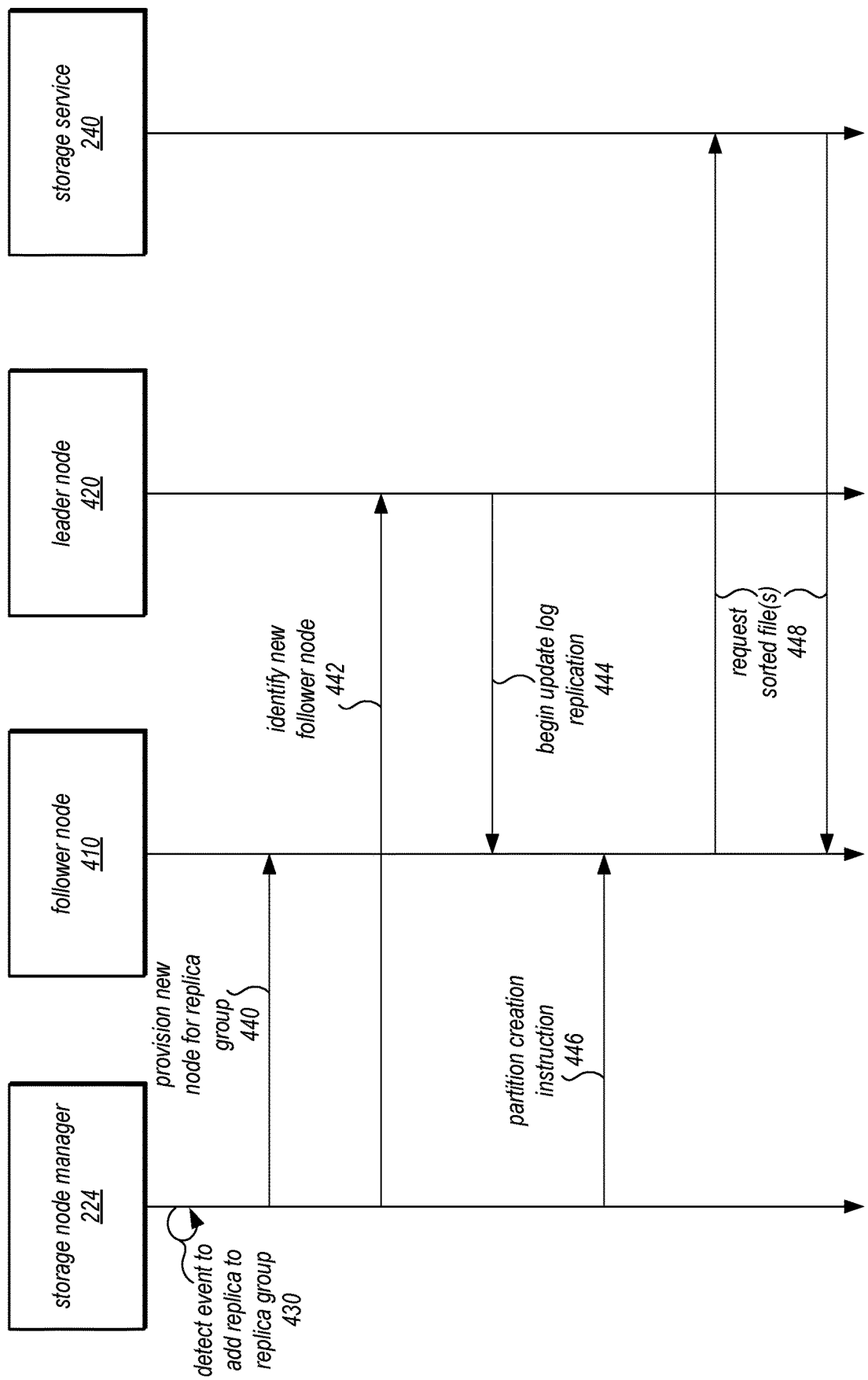
FIG. 4 is a logical block diagram illustrating interactions to add a replica to a replica group, according to some embodiments.

FIG. 4 is a logical block diagram illustrating interactions to add a replica to a replica group, according to some embodiments. As indicated at 430, storage node manager 224 may detect an event to add a replica to a replica group, in some embodiments (e.g., according to the various conditions discussed below with regard to FIG. 9). Storage node manager 224 may send or otherwise provision 440 a new node for the replica group to be a new follower node 410. Storage node manager 224 may send a request 442 to leader node 420 for the replica group to identify follower node 410 as part of the replica group, in some embodiments. In some embodiments, follower node 410 may register or communicate membership directly with leader node 420 (not illustrated). As indicated at 444, leader node 440 may begin update log replica to follower node 410.

As indicated at 224, storage node manager 224 may send a partition creation instruction 446 to follower node 410, which may identify the objects (e.g., files) to obtain to create the database partition at follower node 410, in some embodiments. As indicated at 448, follower node 410 may then perform requests to obtain sorted files from storage service 240 in order to create the database partition at follower node 410, in some embodiments. New replicas may be created in different types of formats. For example, although a follower node may store a local storage replica, the file type or other data format of the local storage replica for follower node 410 may different than the local storage replica formats at other follower nodes (e.g., data formatted for a different type of storage engine), in some embodiments. In this way, additional replicas can be created in a replica group to serve requests for different types of requests (or supported more efficiently) by data stored in the different format.

Figure 5A:
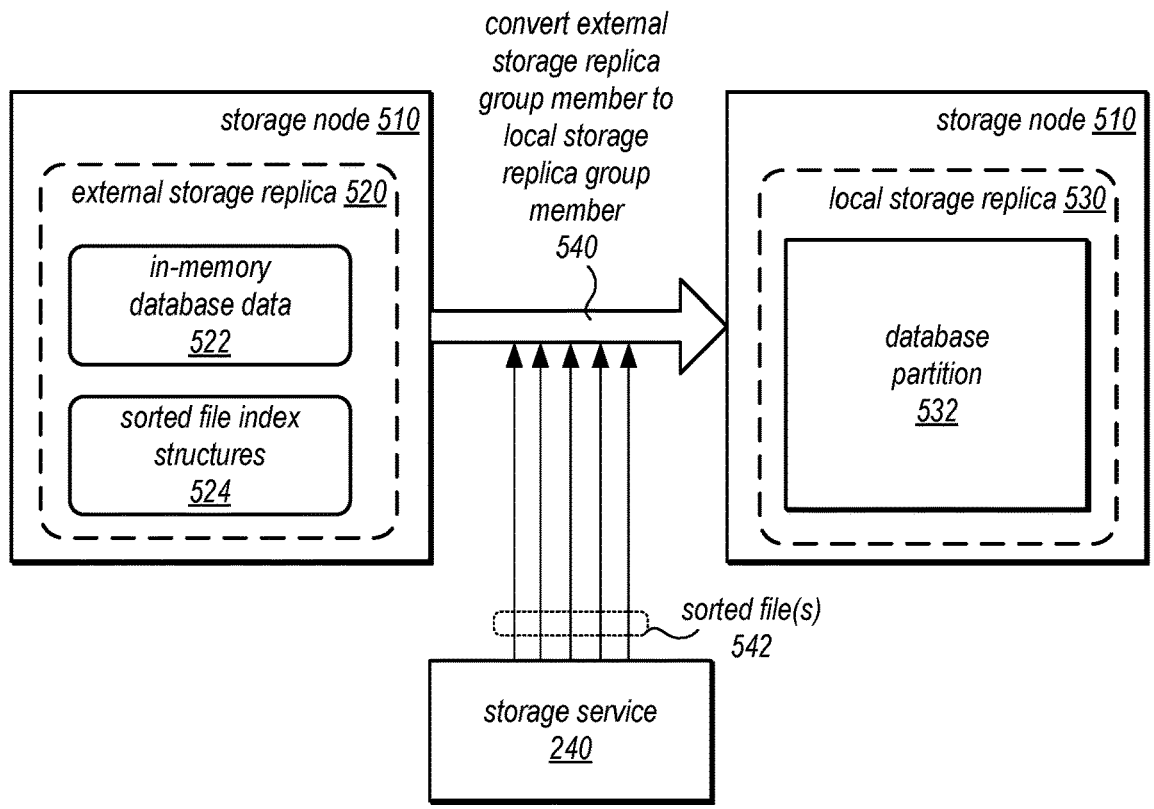
FIG. 5A illustrates an example conversion from one type of storage replica to another, according to some embodiments.

FIG. 5A illustrates an example conversion from one type of storage replica to another, according to some embodiments. Storage node 510 may be an external storage replica 520 for a replica group of a database. In-memory database data 522 may be stored (e.g., hot data cache and an ordered tree for storing update log records) and sorted file index structures 524 (e.g., a bloom filter, skip list, log structured merge tree, etc.). The storage node 510 may be identified for conversion 540 to a local storage replica in the replica group. For example, sorted file(s) 542 may be obtained from storage service 240 and used to create database partition 532 at storage node 510 to use for performing updates and read requests as a local storage replica 530.

Figure 5B:
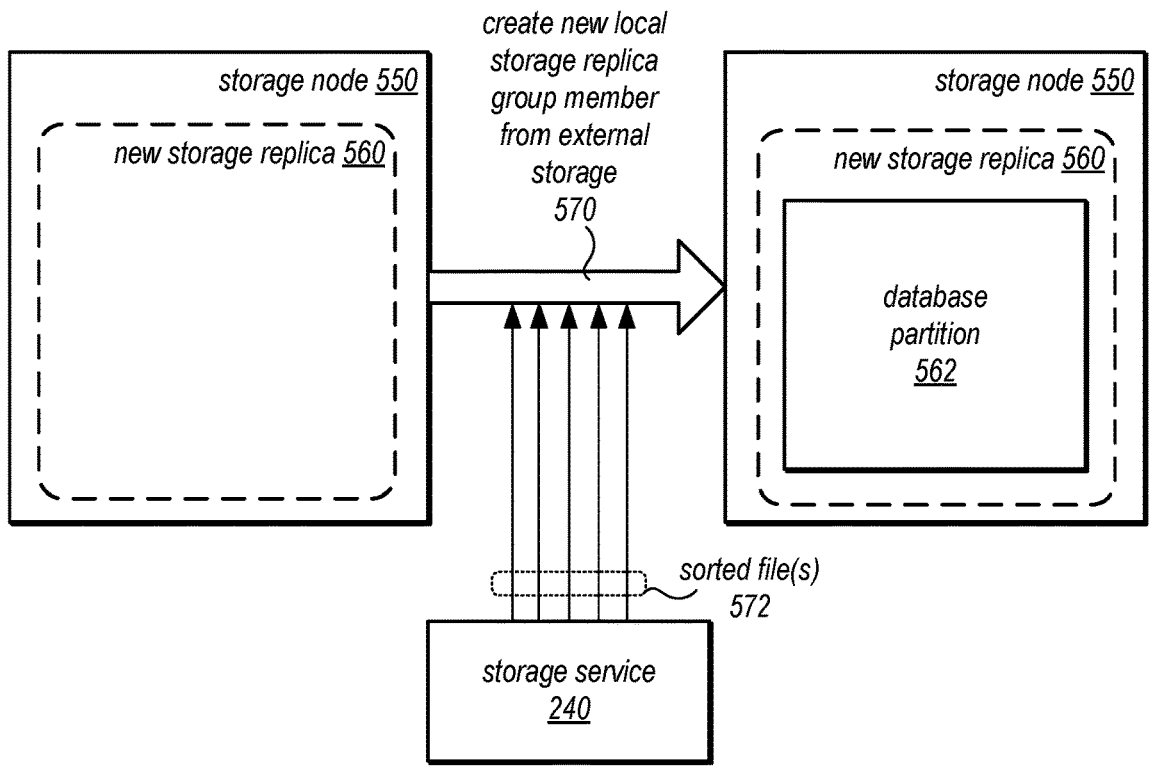
FIG. 5B illustrates an example creation of a new local storage replica from external storage, according to some embodiments.

FIG. 5B illustrates an example creation of a new local storage replica from external storage, according to some embodiments. Similar to the discussion above with regard to FIG. 4, a new storage node 550 may be identified for new storage replica 560. A new local storage replica group member may be created from external storage, as indicated at 570. As illustrated, sorted file(s) 572 may be obtained from storage service 240 and used to create database partition 562 at storage node 550 to use for performing updates and read requests as a local storage replica 560.

Figure 6:
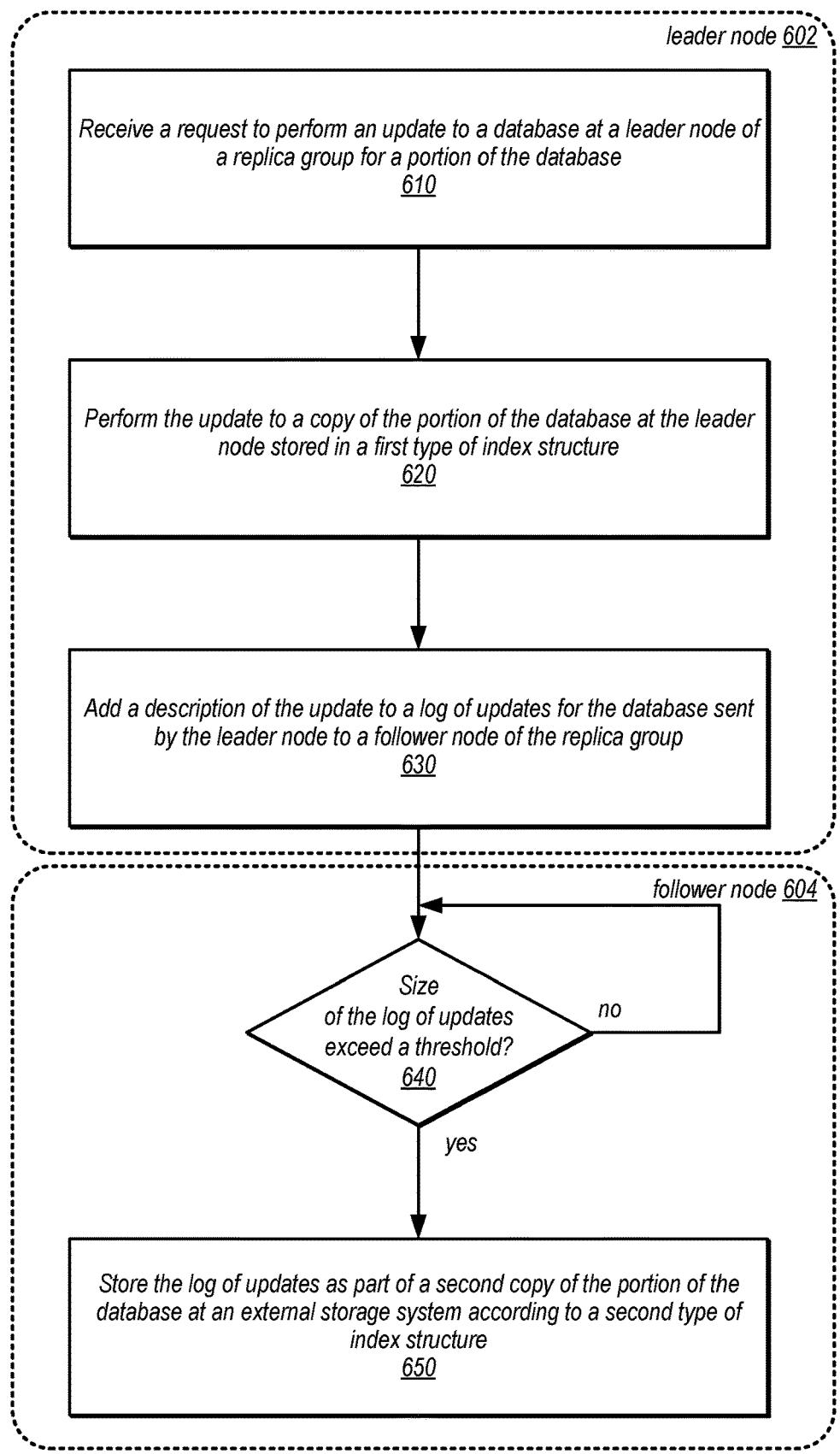
FIG. 6 is a high-level flowchart illustrating various methods and techniques to implement different types of index structures for storing database data in a replica group, according to some embodiments.

The examples of a database that implements different types of index structures for storing database data in a replica group as discussed in FIGS. 2-5B above have been given in regard to a database service (e.g., a relational database, non-relational, or other type of database service). However, various other types of database systems that can advantageously implement a replica group may implement different types of index structures for storing database data in a replica group, in other embodiments. FIG. 6 is a high-level flowchart illustrating various methods and techniques to implement different types of index structures for storing database data in a replica group, according to some embodiments. These techniques, as well as the techniques discussed with regard to FIGS. 7-8, may be implemented using components or systems as described above with regard to FIGS. 2-5B, as well as other types of databases or storage systems, and thus the following discussion is not intended to be limiting as to the other types of systems that may implement the described techniques.

As discussed above with regard to FIGS. 1 and 3, replica groups may utilize different nodes for performing different aspects or features of implementing a replica group, in some embodiments. A leader node, for example, may handle requests to write or otherwise update to a database, whereas a follower node may receive updates from and maintain a secondary copy of a database to ensure durability and increase request handling capacity (e.g., for read requests). As indicated at 610, a request to perform an update to a database may be received at a leader node (e.g., leader node 602) of a replica group for a portion of the database (or all of the database), in some embodiments. For instance, as discussed above with regard to FIGS. 2-5B, a replica group may be a replica group that maintains a partition of a larger database (which may include other partitions).

As indicated at 620, the update may be performed to a copy of the portion at the leader node stored in a first type of index structure, in some embodiments. For example, the leader node may be implemented on a host machine (e.g., a server or storage node similar to those discussed above with regard to FIGS. 2-5B), which may have directly attached storage devices that store the copy. Different types of indexing structures may be used to store the copy. In some embodiments, the type of indexing structure may be a binary tree based indexing structure (e.g., b– tree, b+ tree, etc.).

As indicated at 630, a description of the update may be added to a log of updates for the database sent by the leader node to a follower node of the replica group, in some embodiments. For example, the log may be a buffer or other queue that waits to send updates until a number of size of logged updates are received, or the log of updates may be sent when a new update is added, in some embodiments.

A follower node of the replica group may receive the log of updates, in some embodiments, such as follower node 604. Multiple follower nodes may be implemented in a replica group, or a single follower node may be implemented. Follower nodes may be local storage replicas or external storage replicas, and different combinations of local storage and external storage replicas may be implemented (e.g., a mix of both types or all of one or the other types of storage replicas).

Follower nodes that utilize external storage may evaluate the size of the log of updates received at the follower node, as indicated at 640, in some embodiments. If the size of the log exceeds a threshold size (e.g., a size in bytes), then as indicated at 650, the log of updates may be stored as part of a second copy of the portion of the database at an external storage system according to a second type of index structure, in various embodiments. For example, as discussed below with regard to FIG. 7, the second type of indexing structure may be a log-structured merge tree, in some embodiments.

Figure 7:
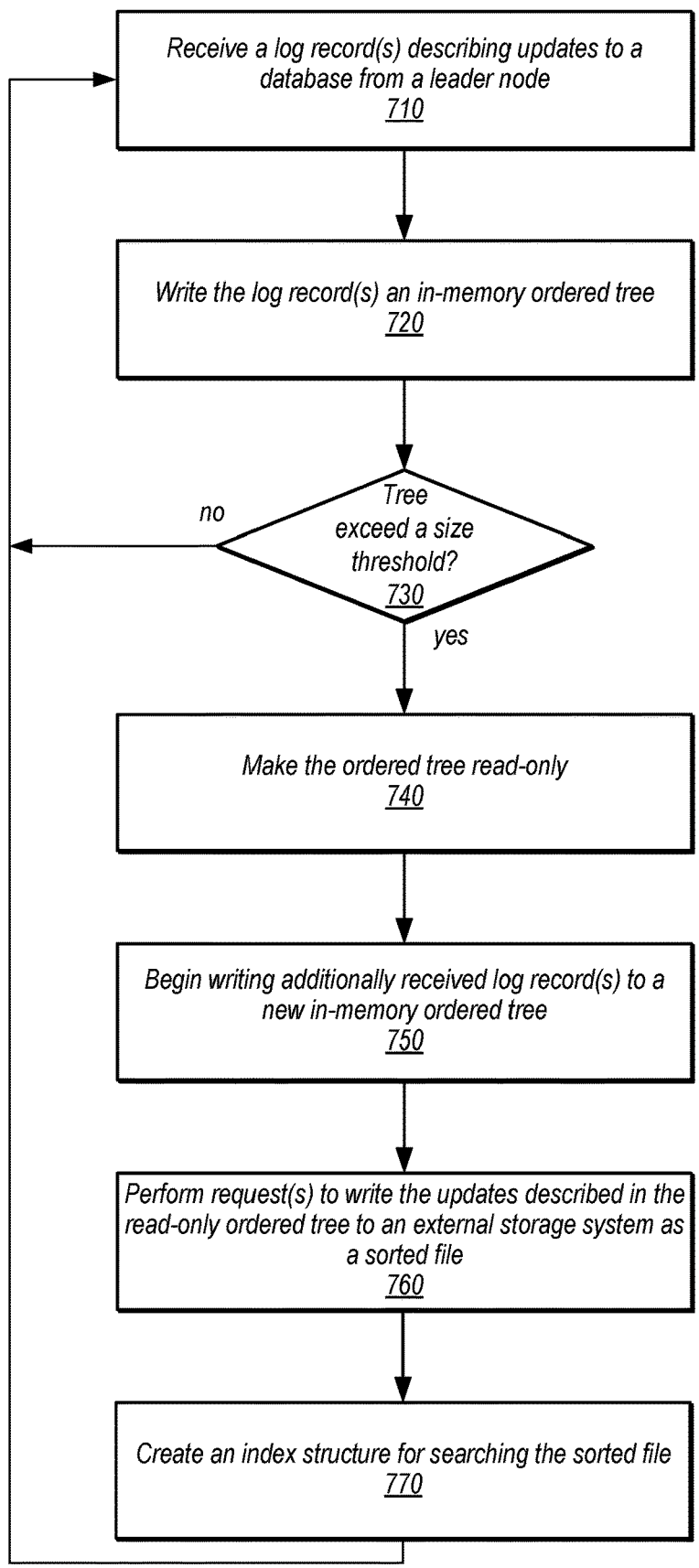
FIG. 7 is a high-level flowchart illustrating various methods and techniques to store a copy to external storage for a replica group, according to some embodiments.

FIG. 7 is a high-level flowchart illustrating various methods and techniques to store a copy to external storage for a replica group, according to some embodiments. As indicated at 710, log record(s) may be received describing updates to a database from a leader node, in some embodiments. As indicated at 720, the log record(s) may be written to an in-memory ordered tree, in some embodiments. As indicated at 730, an evaluation of tree size may be performed. If the tree size does not exceed the threshold, then the in-memory ordered tree may continue to accept new log records, in some embodiments.

As indicated at 740, if the in-memory ordered tree does exceed the size threshold, then the ordered tree may be made read-only, in some embodiments. For example a lock may be obtained for the in-memory ordered tree to prevent other writes to the tree. As indicated at 750, additionally received log records (after making the ordered tree read-only) may be written to a new in-memory ordered tree, in some embodiments. As indicated at 760, one or more requests to write the updates described in the read-only ordered tree may be performed to an external storage system as a sorted filed, in some embodiments. For example, the sorted files may be the formatted as a log-structured merge tree. As indicated at 770, an index structure may be created for searching the sorted file, in some embodiments. For example, the index structure may be a bloom filter, which may represent different key or index values as different bits in a bitmap. If a key/index value is present in the sorted file (e.g., determined when creating the sorted file), then the bit corresponding to that key/index value is set (e.g., to a value of "1"). In some embodiments, a skip list may be used to indicate the presence of index/key values in the sorted file. In some embodiments, a log-structured merge tree may be the index structure.

Figure 8:
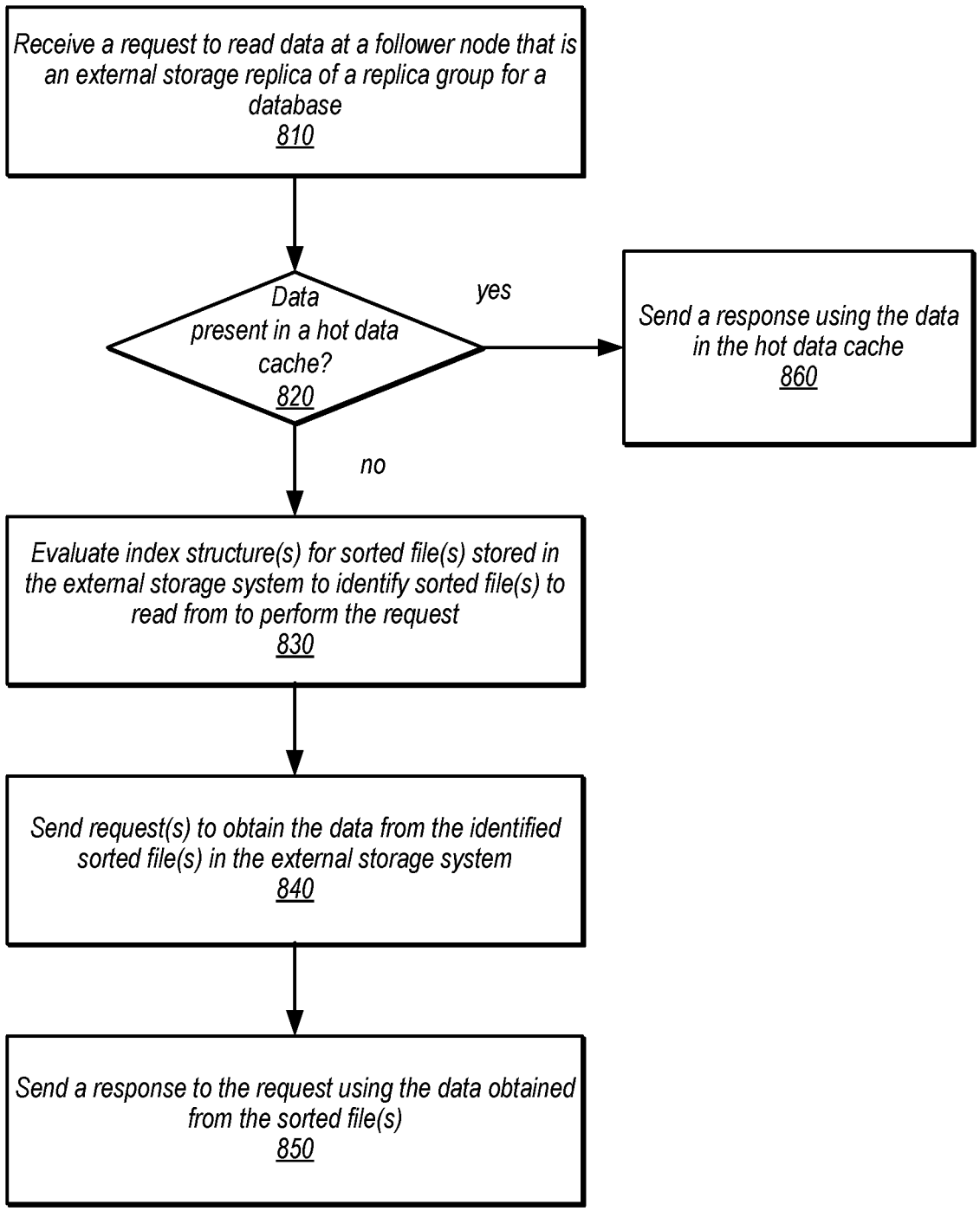
FIG. 8 is a high-level flowchart illustrating various methods and techniques to read database data from a copy in a replica group stored in external storage, according to some embodiments.

FIG. 8 is a high-level flowchart illustrating various methods and techniques to read database data from a copy in a replica group stored in external storage, according to some embodiments. As indicated at 810, a request to read data at a follower node that is an external storage replica of a replica group for a database may be received, in some embodiments. As indicated at 820, a determination may be made as to whether the data is present in a hot data cache, in some embodiments. As indicated by the positive exit from 820, if present, then a response using the data in the hot data cache may be sent in response to the request, as indicated at 860, in some embodiments.

As indicated by the negative exit from 820, if not present, then index structure(s) for sorted file(s) stored in the external storage system may be evaluated to identify the sorted file(s) to read from to perform the request, in some embodiments. As indicated at 840, request(s) to obtain the data from identified sorted filed(s) in the external storage system may be sent, in some embodiments. A response to the request may be sent using the data obtained from the sorted file(s), in response to the request, in some embodiments, as indicated at 850. Caches for specialized or other types of data in addition to or instead of hot data may be implemented in some embodiments. And thus the techniques discussed above may be implemented for these types of caches as well.

Figure 9:
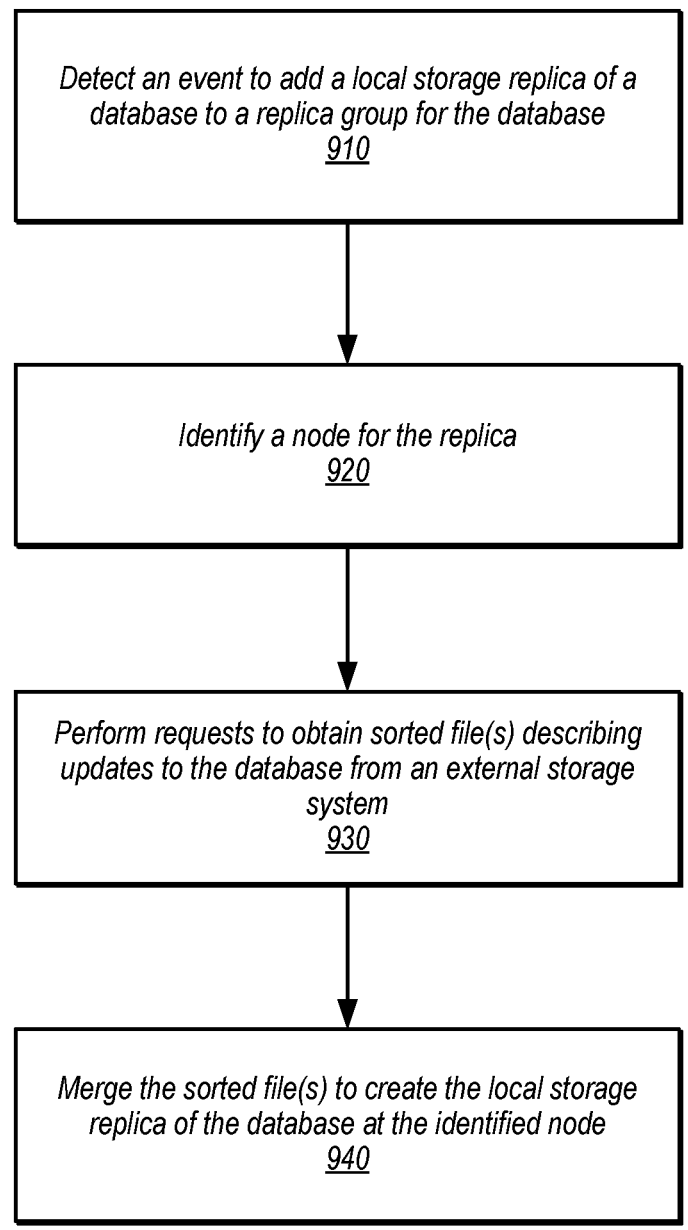
FIG. 9 is a high-level flowchart illustrating various methods and techniques to store items to an index structure for a table partition that co-locates items for the sub-table within the index structure, according to some embodiments.

FIG. 9 is a high-level flowchart illustrating various methods and techniques to store items to an index structure for a table partition that co-locates items for the sub-table within the index structure, according to some embodiments. As indicated at 910, an event to add a local storage replica of a database to a replica group for the database may be detected, in some embodiments. For example, a storage node for a replica may fail and a new node may be added to replace the failing node, in some embodiments. In some embodiments, a new node may be added in addition to existing nodes (e.g., to increase the capacity to perform read requests for the database). In some embodiments, the local storage replica may be added to an existing node that is an external storage replica.

As indicated at 920, a node may be identified for the replica, in some embodiments. For instance, a new node may be provisioned or the existing node identified, in some embodiments. As indicated at 930, one or more requests may be performed to obtain sorted file(s) describing updates to the database from an external storage system, in some embodiments. For example, requests formatted according to the interface of the external storage system (e.g., APIs) may be sent). As indicated at 940, the sorted files may be merged to create the local storage replica of the database at the identified node, in some embodiments. For instance, if the sorted files are different respective log-structured merge trees, the trees may be merged to recreate the local storage replica. As noted above, in some embodiments, the local storage replica may be stored in a different format (e.g., a different file format) than other local storage replicas in the replica group.

The methods described herein may in various embodiments be implemented by any combination of hardware and software. For example, in some embodiments, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 10:
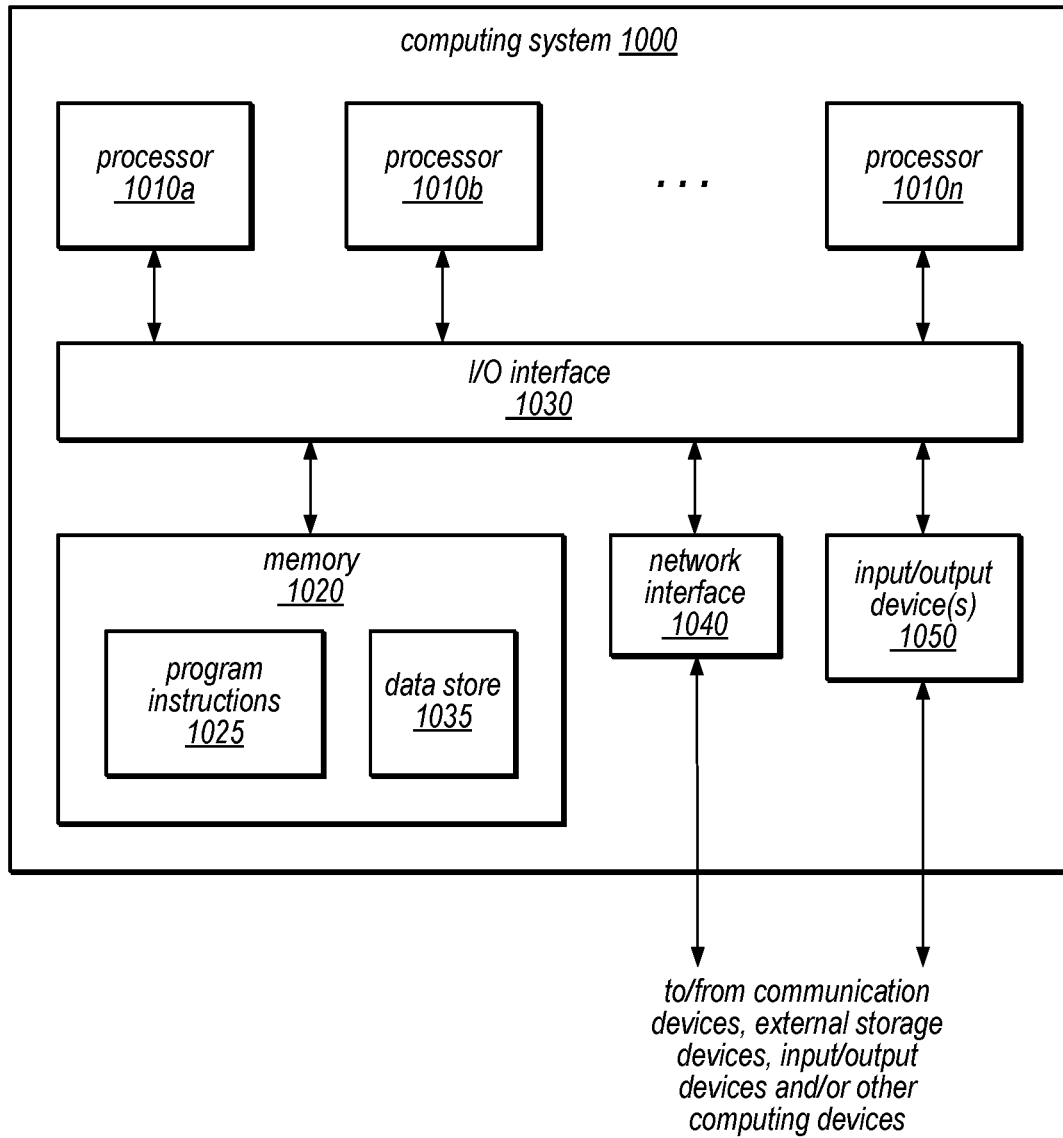
FIG. 10 is a block diagram illustrating an example computing system, according to some embodiments.

Embodiments to implement different types of index structures for storing database data in a replica group as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1000, while in other embodiments multiple such systems, or multiple nodes making up computer system 1000, may host different portions or instances of embodiments. For example, in some embodiments some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in some embodiments. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1020 may store program instructions 1025 and/or data accessible by processor 1010 to implement different types of index structures for storing database data in a replica group, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in some embodiments.

In some embodiments, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in some embodiments. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in some embodiments. Multiple input/output devices 1050 may be present in computer system 1000 or may be distributed on various nodes of computer system 1000, in some embodiments. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, that implement the various embodiments of the systems as described herein, and data store 1035, comprising various data accessible by program instructions 1025, in some embodiments. In some embodiments, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a plurality of nodes of a database system that are members of a replica group for a database hosted by the database system, the nodes respectively comprising a processor and a memory;
   a leader node of the replica group, wherein the leader node is associated with a first type of index structure, and wherein the leader node is configured to:
      receive a request to perform an update to the database;
      responsive to the receipt of the request:
         perform the update to a first copy of at least a portion of the database at the leader node stored in the first type of index structure;
         add a description of the update to a log of updates for the database;
         send the log of updates, including the description of the update, to a follower node of the replica group;
   the follower node of the replica group, wherein the follower node is associated with a second type of index structure that is different from the first type of index structure, and wherein the follower node is configured to:
      receive the log of updates, including the description of the update, from the leader node of the replica group;
      responsive to a determination that a size of the log of updates received by the follower node is below a threshold, store the log of updates at a data store that is local to the follower node, wherein the log of updates is stored at the data store that is local to the follower node for subsequently receiving and storing one or more descriptions of additional updates until the size of the log of updates is no longer below the threshold; and
      responsive to a determination that the size of the log of updates at the follower node meets or exceeds the threshold, store the log of updates according to the second type of index structure at an external storage and as part of a second copy of the portion of the database and update the second copy of the portion of the database according to the log of updates.

2. The system of claim 1, wherein:
   the leader node is further configured to send the one or more records from the log of updates, including the update, to another follower node of the replica group;
   the other follower node of the replica group is configured to:
      receive the one or more records from the log of updates; and
      apply the one or more records to a third copy of the portion of the database stored at the other follower node.

3. The system of claim 1, further comprising one or more nodes respectively comprising a processor and a memory configured to implement a control plane for the database system, the control plane configured to:
   detect an event to add a local storage replica to the replica group for the database;
   provision a new node for the replica group for the local storage replica;
   cause one or more requests to be performed to the external storage system to obtain the file at the new node, wherein the local storage replica is created at the new node based, at least in part, on the file.

4. The system of claim 1, wherein the follower node is further configured to:
   create an index structure for the file at the external storage service;
   receive a request to read from the portion of the database;
   evaluate the index structure to select the file from amongst a plurality of files stored for the database at the external storage system;
   send a request to read from the file in the external storage system; and
   send a response to the request based on the read from the file.

5. A method, comprising:
   receiving a request to perform an update to a database at a leader node of a replica group for at least a portion of the database, wherein the leader node is associated with a first type of index structure;
   responsive to receiving the request:
      performing, by the leader node, the update to a first copy of the portion of the database at the leader node of the replica group stored in the first type of index structure;
      adding, by the leader node, a description of the update to a log of updates for the database sent by the leader node to a follower node of the replica group, wherein the follower node is associated with a second type of index structure that is different from the first type of index structure;
      before a size of the log of updates received at the follower node exceeds a threshold, storing, by the follower node, the log of updates at a data store that is local to the follower node, wherein the log of updates is stored at the data store that is local to the follower node for subsequently receiving and storing one or more descriptions of additional updates until the size of the log of updates is no longer below the threshold; and after the size of the log of updates at the follower node exceeds the threshold, storing, by the follower node, a copy of the log of updates according to the second type of index structure at an external storage and as part of a second copy of the portion of the database and updating the second copy of the portion of the database according to the copy of the log of updates.

6. The method of claim 5, wherein:
the data store that is local to the follower node includes an in-memory ordered tree;
determining that the size of the log of updates received at the follower node exceeds the threshold is an evaluation of a size of the in-memory ordered tree;
the method further comprises:
  making, by the follower node, the in-memory ordered tree read-only;
  beginning, by the follower node, writing additionally received updates from the log of updates to a new in-memory ordered tree, wherein the log of updates are stored as a sorted file according to the second type of index structure; and
  creating, by the follower node, an index structure to search the sorted file.

7. The method of claim 6, wherein the index structure is a bloom filter.

8. The method of claim 6, further comprising:
receiving, at the follower node, a request to read data from the portion of the database;
evaluating, by the follower node, the index structure to identify the sorted file from amongst a plurality of sorted files to obtain the data to perform the request to read the data;
sending, by the follower node, a request to obtain the data from the sorted file to the external storage system; and
sending, by the follower node, a response to the request to read the data using the data obtained from the sorted file in the external storage system.

9. The method of claim 8, further comprising:
determining, by the follower node, that the data is not present in a hot data cache at the follower node.

10. The method of claim 6, further comprising:
receiving, at the follower node, a request to read data from the portion of the database;
searching, by the follower node, the in-memory ordered tree to obtain the data to perform the request to read the data; and
sending, by the follower node, a response to the request to read the data using the data obtained from the in-memory ordered tree.

11. The method of claim 5, further comprising:
detecting, by the database system, an event to add a local storage replica to the replica group;
identifying, by the database system, a node for the local storage replica;
obtaining, the sorted and one or more other sorted files for other updates to the portion of the database; and
merging the sorted file and the one or more other sorted files to create the local storage replica at the identified node.

12. The method of claim 11, wherein the local storage replica created at the identified node is in a different format than another local storage replica of the replica group at a different node of the replica group.

13. The method of claim 5, wherein the database system is a non-relational database service offered by a provider network, wherein the external storage system is a storage service offered by the provider network, and wherein storing the log of updates is stored as a file in the storage service.

14. One or more non-transitory, computer-readable storage media, storing program instructions that when executed on or across one or more computing devices cause the one or more computing devices to implement:
receiving, at a follower node of a replica group, one or more updates from a log of updates, wherein the one or more updates from the log of updates are for at least a portion of a database, wherein the one or more updates are generated by a leader node for the replica group, wherein the leader node stores a first copy of at least a portion of the database according to a first type of index structure, wherein the leader node is associated with the first type of index structure, and wherein the follower node is associated with a second type of index structure that is different from the first type of index structure; and
responsive to a determination that the log of updates received at the follower node is below a threshold, storing, by the follower node, the log of updates at a data store that is local to the follower node, wherein the log of updates is stored at the data store that is local to the follower node for subsequently receiving and storing one or more additional updates until the size of the log of updates is no longer below the threshold; and
responsive to determining that the log of updates at the follower node meets or exceeds the threshold, storing, by the follower node, a copy of the log of updates according to the second type of index structure at an external storage system and as part of a second copy of the portion of the database and updating the second copy of the portion of the database according to the copy of the log of updates.

15. The one or more non-transitory, computer-readable storage media of claim 14, wherein the data store that is local to the follower nodes includes an in-memory ordered tree, wherein determining that the size of the log of updates received at the follower node exceeds the threshold is an evaluation of a size of the in-memory ordered tree, and wherein the further program instructions that when executed on or across the one or more computing devices cause the one or more computing devices to further implement:
  making, by the follower node, the in-memory ordered tree read-only;
  beginning, by the follower node, writing additionally received updates from the log of updates to a new in-memory ordered tree, wherein the of updates are stored as a sorted file according to the second type of index structure; and
  creating, by the follower node, an index structure to search the sorted file.

16. The one or more non-transitory, computer-readable storage media of claim 15, wherein the index structure to search the sorted file is a skip list.

17. The one or more non-transitory, computer-readable storage media of claim 15, store further program instructions that when executed on or across the one or more computing devices cause the one or more computing devices to implement:
receiving, at the follower node, a request to read data from the portion of the database;
evaluating, by the follower node, the index structure to identify the sorted file from amongst a plurality of sorted files to obtain the data to perform the request to read the data;

sending, by the follower node, a request to obtain the data from the sorted file to the external storage system; and sending, by the follower node, a response to the request to read the data using the data obtained from the sorted file in the external storage system.

18. The one or more non-transitory, computer-readable storage media of claim 15, store further program instructions that when executed on or across the one or more computing devices cause the one or more computing devices to implement:

receiving, at the follower node, a request to read data from the portion of the database;

determining, by the follower node, that the data is present in a hot data cache at the follower node; and sending, by the follower node, a response to the request to read the data using the data obtained from the hot data cache.

19. The one or more non-transitory, computer-readable storage media of claim 15, store further program instructions that when executed on or across the one or more computing devices cause the one or more computing devices to implement:

receiving, at the follower node, a request to read data from the portion of the database;

searching, by the follower node, the in-memory ordered tree to obtain the data to perform the request to read the data; and sending, by the follower node, a response to the request to read the data using the data obtained from the in-memory ordered tree.

20. The one or more non-transitory, computer-readable storage media of claim 14, wherein the database system is a database service offered by a provider network, wherein the external storage system is a storage service offered by the provider network, and wherein storing the log of updates is stored as a file in the storage service.

* * * * *